United States Patent
Ma et al.

(10) Patent No.: US 10,611,975 B2
(45) Date of Patent: Apr. 7, 2020

(54) CONSTANT LIQUID LEVEL GASIFICATION FURNACE WITH WASTE BOILER

(71) Applicant: BEIJING QING CHUANG JIN HUA TECHNOLOGY CO., LTD., Beijing (CN)

(72) Inventors: Hongbo Ma, Beijing (CN); Jun Yue, Beijing (CN); Shuai Wang, Beijing (CN)

(73) Assignee: Beijing Qing Chuang Jin Hua Technology Co., Ltd., Beijing (CN)

( * ) Notice: Subject to any disclaimer, the term of this patent is extended or adjusted under 35 U.S.C. 154(b) by 95 days.

(21) Appl. No.: 15/811,662

(22) Filed: Nov. 13, 2017

(65) Prior Publication Data

US 2018/0195015 A1 Jul. 12, 2018

(30) Foreign Application Priority Data

Jan. 10, 2017 (CN) .......................... 2017 1 0016372

(51) Int. Cl.
| | |
|---|---|
| *C10J 3/86* | (2006.01) |
| *C10J 3/82* | (2006.01) |
| *C10J 3/56* | (2006.01) |
| *C10J 3/52* | (2006.01) |
| *F28D 21/00* | (2006.01) |

(Continued)

(52) U.S. Cl.
CPC ................. *C10J 3/86* (2013.01); *C10J 3/485* (2013.01); *C10J 3/52* (2013.01); *C10J 3/56* (2013.01); *C10J 3/723* (2013.01); *C10J 3/76* (2013.01); *C10J 3/82* (2013.01); *C10J 3/845* (2013.01); *F28D 21/001* (2013.01); *C10J 2300/0936* (2013.01); *C10J 2300/0976* (2013.01); *F22B 1/1846* (2013.01); *Y02P 20/129* (2015.11)

(58) Field of Classification Search
CPC ......... C10J 3/52; C10J 3/56; C10J 3/82; C10J 3/86
See application file for complete search history.

(56) References Cited

U.S. PATENT DOCUMENTS

| 4,309,196 A | * | 1/1982 | Vollhardt | ................... C10J 3/00 48/77 |
| 5,687,657 A | * | 11/1997 | Ziegler | .................. B01D 45/06 110/203 |

(Continued)

FOREIGN PATENT DOCUMENTS

CN 204434565 U * 7/2015

OTHER PUBLICATIONS

CN204434565U—machine translation (Year: 2015).*

*Primary Examiner* — Nathaniel Herzfeld

(57) ABSTRACT

The present disclosure relates to a constant liquid level gasification furnace with a waste boiler comprising: a housing; an upper portion of the housing is defined as a gasification section, a middle portion of the housing is defined as a radiant section, and a lower portion of the housing is defined as a quenching section. The gasification section internally includes a membrane type water-cooled wall, wherein the inner region defined by the membrane type water-cooled wall is a gasification chamber. The radiant section internally includes a built-in radiant waste boiler assembly, wherein the internal region defined by the built-in radiant waste boiler assembly is a radiant chamber. The region defined by the quenching section is a quenching chamber.

8 Claims, 3 Drawing Sheets

(51) Int. Cl.
*C10J 3/72* (2006.01)
*C10J 3/84* (2006.01)
*C10J 3/76* (2006.01)
*C10J 3/48* (2006.01)
*F22B 1/18* (2006.01)

(56) References Cited

U.S. PATENT DOCUMENTS

| | | | | |
|---|---|---|---|---|
| 6,161,490 | A * | 12/2000 | Fujinami | C10J 3/482 |
| | | | | 110/213 |
| 6,755,980 | B1 * | 6/2004 | Van Den Born | C10J 3/00 |
| | | | | 210/767 |
| 8,187,349 | B2 * | 5/2012 | Jancker | C10J 3/06 |
| | | | | 122/7 R |
| 8,882,867 | B2 * | 11/2014 | Kuske | C10J 3/485 |
| | | | | 48/61 |
| 9,051,522 | B2 * | 6/2015 | Jancker | C10J 3/485 |
| 2014/0030668 | A1 * | 1/2014 | Zhang | C10J 3/526 |
| | | | | 432/238 |

* cited by examiner

CONSTANT LIQUID LEVEL GASIFICATION FURNACE WITH WASTE BOILER

CROSS-REFERENCE OF THE RELATED APPLICATIONS

The present application is based upon and claims priority of Chinese Patent Application No. 201710016372.7, filed before Chinese Patent Office on Jan. 10, 2017 and entitled "Constant Liquid Level Gasification Furnace with Waste Boiler," the entire contents of which is incorporated herein by reference.

FIELD OF THE INVENTION

The present disclosure relates to the field of coal gasification technology, and more particularly to a constant liquid level gasification furnace with a waste boiler.

BACKGROUND OF THE INVENTION

The gasification furnace of the present disclosure refers to a coal gasification furnace, also known as a gas producer, which is a furnace for producing the combustible gas by using a coal as a gasification fuel. The waste boiler (i.e., waste heat boiler, also known as exhaust heat boiler (waste heat boiler)) is a heat exchanger for producing the steam by using the high-temperature logistics in the production process as a heat source, which is both a cooler of high-temperature substance stream in the process and a power device which is provided steam by means of the waste heat.

The gasification furnace in the related art, such as a gasification furnace with a waste boiler having a radiation waste boiler assembly, has been widely recognized in the gasification field. The characteristics which the above gasification furnace can burn cheap coal having a high ash melting point make a number of user manufacturers to obtain a remarkable profit, and radiant heat of high temperature crude coal gas has been recovered in the form of steam, and then crude coal gas has quenched to the required temperature by means of water. The traditional gasification furnace with a waste boiler needs to adjust the flow rate of the ash-discharging water to control the liquid level of the quenching chamber to ensure that the water film passage is in a safe position below the liquid level, but it can't be foolproof to control the liquid level by the man-made operation and the instrument, and there is a certain security risk.

The Chinese patent document, entitled Publication No. CN202881213U, discloses a liquid level holding device of a gasification furnace quenching chamber for a water quenching process comprising a gasification furnace main body, a scrubber (washing tower), a high pressure condensate tank and a condensate pump; wherein the product gas outlet pipe of the gasification furnace main body is communicated with the scrubber, and the high pressure condensate tank is respectively communicated with the gasification furnace main body, the product gas outlet pipe and the scrubber through the condensate pump, and further comprising a condensate water supply pipe which is communicated with the condensate inlet pipe provided on the product gas outlet pipe of the gasification furnace main body, and a connection loose joint is provided at the top of the medium pressure nitrogen inlet pipe of the gasification furnace main body. The medium pressure nitrogen inlet pipe and the condensate water supply pipe are movably connected by the connection loose joint. The condensate water supply pipe and the medium pressure nitrogen inlet pipe are provided with cut-off valves, respectively. It has advantages of improving the operating cycle of the gasification furnace, reducing the number of turning down the gasification furnace, and decreasing the economic loss and the security risk.

The Chinese patent document, which has Application Publication No. CN104101402A, discloses an accurate measurement system for the liquid level of a gasification furnace quenching chamber, comprising a gasification furnace quenching chamber and a differential pressure level gauge. The lower part of said gasification furnace quenching chamber is provided with a double flange differential pressure level transmitter connected with the density operation module through the signal line, and the density operation module is connected with the differential pressure level gauge through the signal line. The upper flange mouth and the lower flange mouth of the double flange differential pressure level transmitter are respectively arranged in the lower part of the gasification furnace quenching chamber, and the position connected the upper flange mouth to the gasification furnace quenching chamber is between the minimum running level and the level of an oven. The accurate measuring system of the disclosure can not only measure the actual height of the liquid level in real time, but also ensure the measurement of the liquid level in the oven.

The above method and apparatus for maintaining the liquid level of the gasification furnace are both complex and costly and still require manual operation. Therefore, there is a need in the art for a gasification furnace product which is simple in construction, easy in installation and maintenance, and does not require manual operation and which can fundamentally ensure the safety of the liquid level of the gasification furnace. In addition, from the viewpoint of energy saving and energy comprehensive utilization, the gasification furnace should also be equipped with a waste boiler assembly.

SUMMARY OF THE INVENTION

In order to solve the above technical problems, the present disclosure provides a constant liquid level gasification furnace with a waste boiler, which can use coal having a high ash melting point for the production of crude coal gas and recover the radiant heat of hot crude coal gas in the form of steam, but also make the liquid level of the gasification furnace equipment basically held the constant liquid level through the structure of the gasification furnace, without human intervention, which thereby fundamentally ensure the safety of gasification furnace operation.

In order to achieve the above object, the present disclosure provides a constant liquid level gasification furnace with a waste boiler comprising: a housing and an inner assembly; an upper portion of the inner space of the housing is defined as a gasification section, the middle portion thereof is defined as a radiant section, and lower portion thereof is defined as a quenching section.

The gasification section internally includes a burner, a membrane type water-cooled wall and a heat-resistant passage, wherein the inner region defined by the membrane type water-cooled wall is a gasification chamber;

The radiant section internally includes a built-in radiant waste boiler assembly, wherein the internal region defined by the built-in radiant waste boiler assembly is a radiant chamber;

The quenching section internally includes a quenched water inlet, a quenched water film generator, a water film channel, a crude coal gas outlet and a slag outlet, wherein the region defined by the quenching section is a quenching chamber.

Further, the burner is at the top of the housing, and the burner passes through the housing and the membrane type water-cooled wall into the interior of the gasification chamber. The bottom of the gasification chamber has a heat-resistant passage.

Further, the heat-resistant passage extends into the interior of the radiant chamber, and the bottom of the radiant chamber has a water film passage.

Further, the water film passage extends below the level of the quenching chamber. The quenched water inlet is connected with the quenched water film generator, which is connected with the top of the water film passage. The crude coal gas outlet is provided on the housing of the quenching section.

Further, at the axial height of the housing, the bottom end of the water film passage is lower than the lower edge of the crude coal gas outlet so that the washed ash water overflows through the overflow to the crude coal gas outlet, and was sent to the subsequent workshop section together with the washed crude coal gas.

In one embodiment, at the axial height of the housing, the bottom end of the water film passage is 50 to 200 cm lower than the lower edge of the crude coal gas outlet, preferably 50 to 100 cm, more preferably 80 to 100 cm.

In one embodiment, the built-in radiant waste boiler assembly employs a double-sided water-cooled wall arrangement or a partial double-sided water-cooled wall arrangement.

The technical solution of the present disclosure is characterized by:

The structure of the present equipment is reasonable, easy in installation and maintenance, and the liquid level of the gasification furnace equipment is basically maintained a constant liquid level by means of the structure design of the gasification furnace, without human intervention, which thereby fundamentally ensures the safety of gasification furnace operation. A membrane type water-cooled wall is used as the housing protection device of the gasification section, which can ensure that the housing temperature of the gasification section is stable and is not overheating, and is not affected by the internal reaction temperature of the gasification chamber, thereby totally accepting the test of coal having high ash melting point. The main role of the built-in radiant waste boiler assembly is to absorb the radiant heat of the hot crude coal gas to produce steam for the generating unit for power generation. In addition, it also serves as a housing protection device of the radiant section to ensure that the housing temperature of the radiant section is not overheating. The quenching chamber may not be provided with the ash water outlet. The level of the quenching chamber is not controlled, and the ash water is discharged from the gasification furnace by means of the overflowing together with the quenched crude coal gas. The liquid level height of the quenching chamber is kept a constant liquid level. The overheating risk of the housing of the quenching section is cut off from the source, and the structure can cause the gasification furnace equipment with a waste boiler itself to be a safe and reliable in the true sense.

Figure 1:
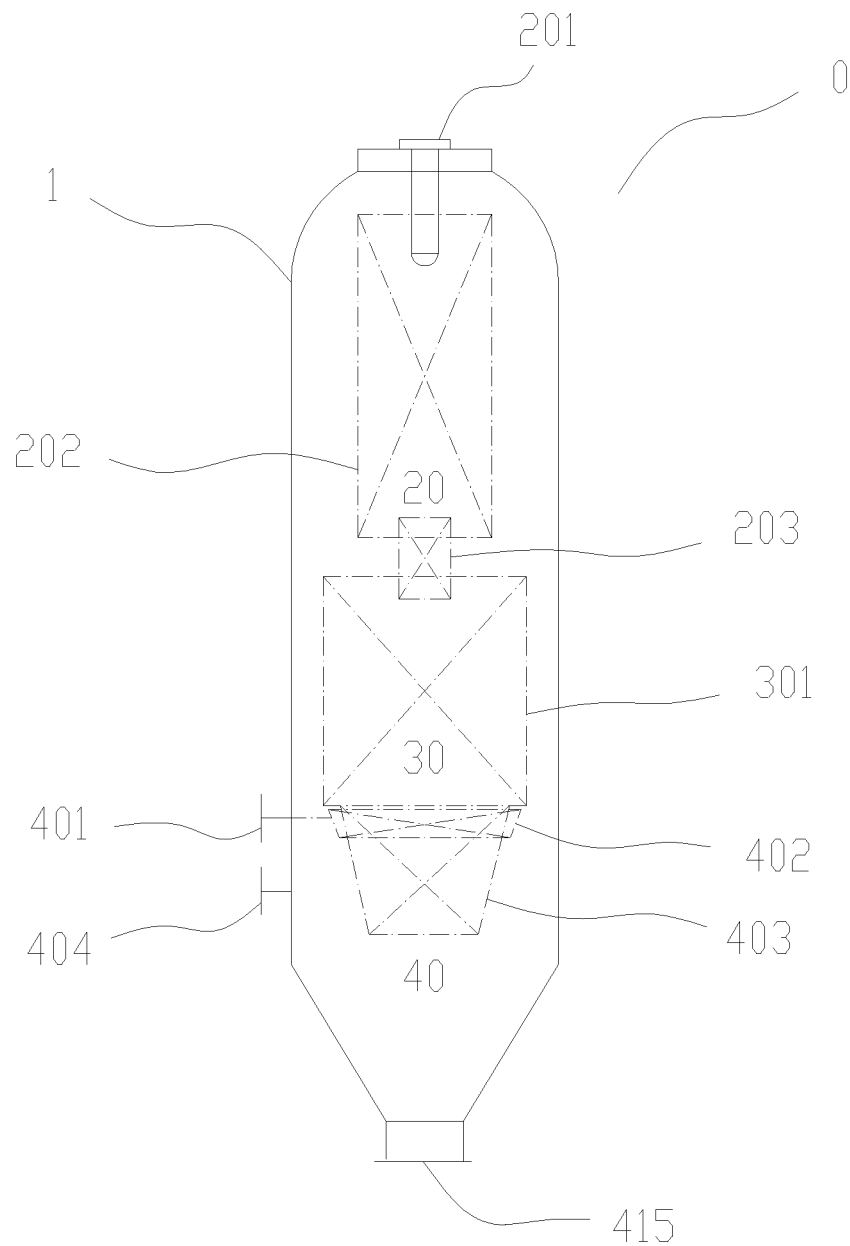
FIG. 1 is a schematic cross-sectional view of a constant liquid level gasification furnace with waste heat boiler according to an embodiment of the present disclosure.

REFERENCE SIGNS a constant liquid level gasification furnace with a waste boiler (0), a housing (1), a gasification section (2), a radiant section (3), a quenching section (4), a gasification chamber (20), a radiation chamber (30), a burner (201), a membrane type water-cooled wall (202), a heat-resistant passage (203), a built-in radiant waste boiler assembly (301), a quenched water inlet (401), a quenched water film generator (402), a water film passage (403), a crude coal gas outlet (404), and a slag outlet (415).

DETAILED DESCRIPTION

The technical solution of the present disclosure will now be described further by way of examples and the accompanying drawings. An example of such an embodiment is shown in the accompanying drawings in which like reference numerals always refer to like or similar elements or elements having the same or similar functions. It should be understood that the embodiments described hereinafter with reference to the accompanying drawings are only exemplary and are intended to be illustrative of the disclosure and are not to be construed as limiting of the present disclosure.

Figure 2:
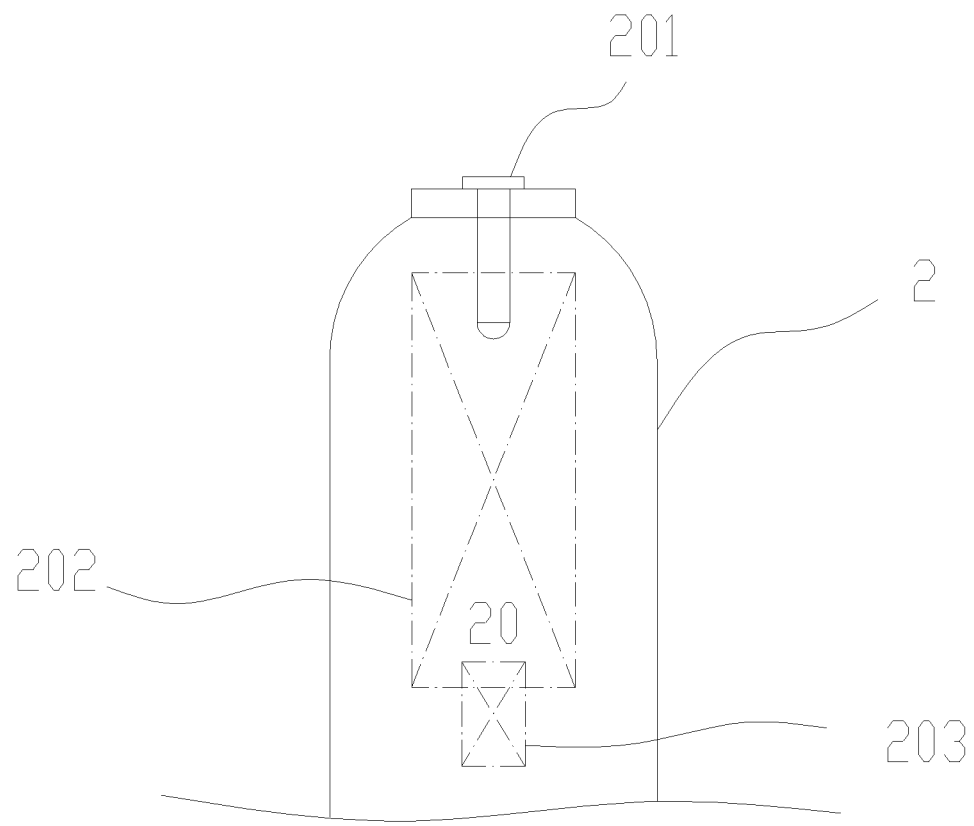
FIG. 2 is a schematic cross-sectional view of the gasification section.
Figure 3:
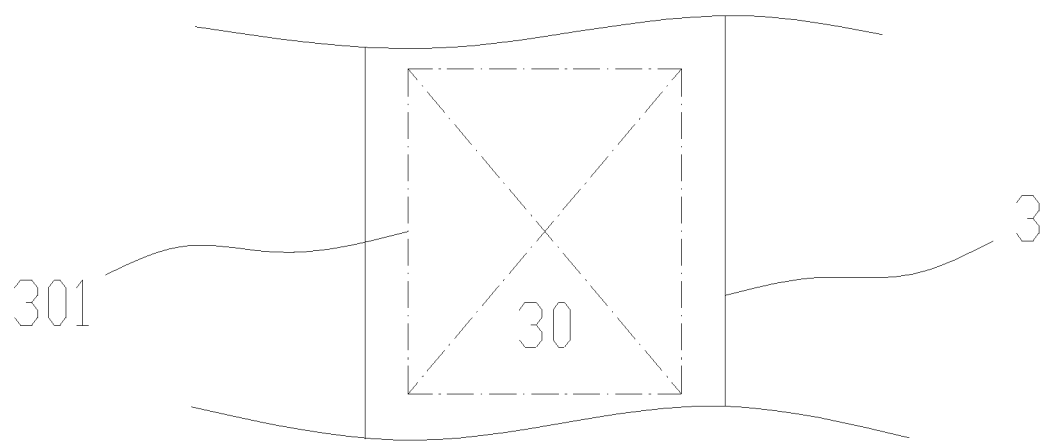
FIG. 3 is a schematic cross-sectional view of the radiant section.
Figure 4:
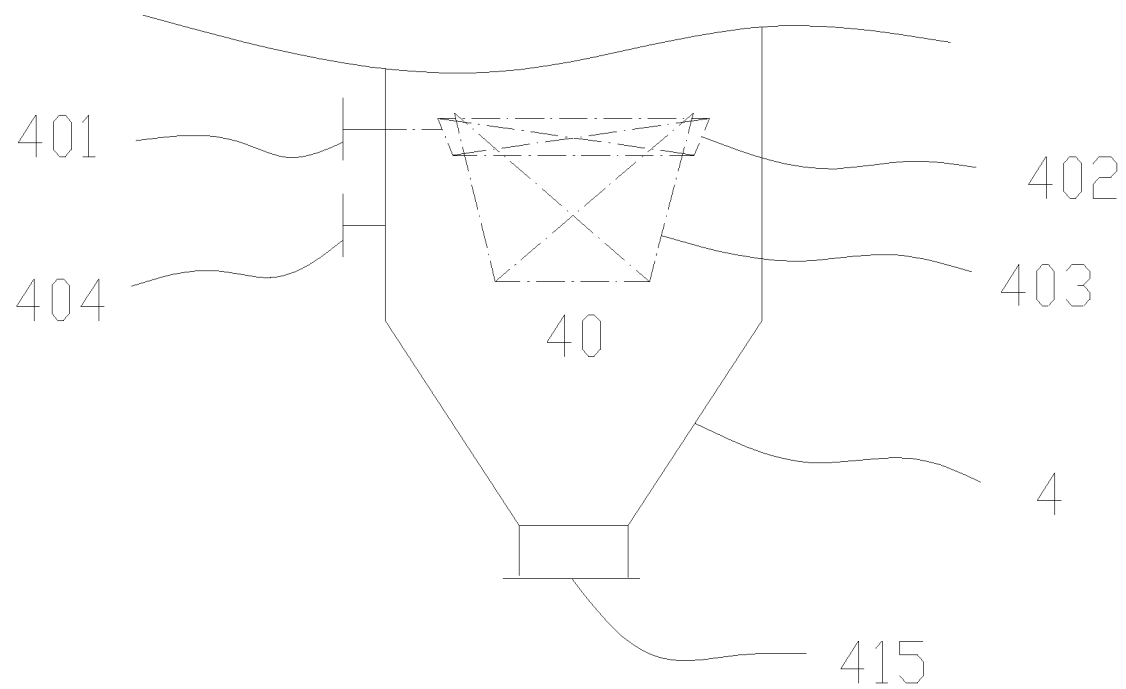
FIG. 4 is a schematic cross-sectional view of the quenching section.

As shown in FIGS. 1-4, there is shown a schematic cross-sectional view of the overall structure of a constant liquid level gasification furnace with a waste boiler and a structural cross-sectional view of the gasification section, the radiant section and the quenching section in one embodiment of the present disclosure, wherein:

a constant liquid level gasification furnace with a waste boiler 0 comprises a housing 1, and an inner assembly. The upper portion of the inner space of the housing 1 is defined as the gasification section 2, the middle portion thereof is defined as the radiant section 3 and the lower portion thereof is defined as the quenching section 4.

The gasification section 2 internally includes a burner 201, a membrane type water-cooled wall 202, and a heat-resistant passage 203, wherein the inner region defined by the membrane type water-cooled wall 202 is a gasification chamber 20;

The radiant section 3 internally comprises a built-in radiant waste boiler assembly 301, wherein the internal region defined by the built-in radiant waste boiler assembly 301 is a radiation chamber 30;

The quenching section 4 internally includes a quenched water inlet 401, a quenched water film generator 402, a water film passage 403, a crude coal gas outlet 404, and a slag outlet 415, wherein the region defined by the quenching section 4 is the quenching chamber 40.

The burner 201 is at the top of the housing 1 and the burner 201 passes through the housing 1 and the membrane type water-cooled wall 202 into the interior of the gasification chamber 20. The bottom of the gasification chamber 20 has a heat-resistant passage 203.

The heat-resistant passage 203 is extended into the interior of the radiation chamber 30, and the bottom of the radiation chamber 30 has a water film passage 403.

The water film passage 403 is extended below the liquid level of the quenching chamber 40. The quenched water inlet 401 is connected with the quenched water film generator 402. The quenched water film generator 402 is connected with the tip of the water film passage 403, and the crude coal gas outlet 404 is provided on the housing 1 of the quenching section. At the axial height of the housing 1, the bottom end of the water film passage 403 is lower than the lower edge of the crude coal gas outlet 404. In one embodiment, the bottom end of the water film passage 403 is 100 cm lower than the lower edge of the crude coal gas outlet 404 at an axial height of the housing 1.

The operation process of a constant liquid level gasification furnace with a waste boiler according to the present disclosure will be described with reference to FIGS. 1-4 as follows:

The water coal slurry and oxygen as the raw material for a coal gasification reaction are mixed by means of the burner 201 and injected into the gasification chamber 20, and the gasification reaction occurs in the gasification chamber 20 to produce the crude coal gas and slag. The membrane type water-cooled wall 202, as a housing protection device of the gasification section, can ensure that the housing 1 of the gasification section is stable in temperature and is not affected by the reaction temperature within the gasification chamber 20 and can totally accept the test of coal having a high ash melting point.

The resulting crude coal gas and slag enter the built-in radiant waste boiler assembly 301 from the heat-resistant passage 203 at the bottom of the gasification chamber 20. The main function of the built-in radiant waste boiler assembly 301 is to absorb the radiant heat of the hot crude coal gas to generate the steam for the generating unit for power generation, and also severs as the housing protection device of the radiant section 3 to ensure that its temperature is stable and is not over-heating. In one embodiment, the built-in radiant waste boiler assembly 301 employs a partially double-sided water-cooled wall arrangement.

The crude coal gas and slag from the radiant chamber 30 enter below the liquid level of the quenching chamber 40 through the water film passage 403, and the crude coal gas and the slag are sufficiently bubbled in the water bath to complete the washing and cooling. The quenched water enters the quenched water film generator 402 through the quenched water inlet 401 to form a water film. On the one hand, the water film will as flushing water continuously wash away the slag fell on the water film passage 403 to prevent the slag from the aggregation and blocking. On the other hand, the water film is distributed as protective water on the inner wall of the water film passage 403 to prevent the water film passage 403 from being deformed due to the local overheating. The quenched water is mainly used for the washing and cooling of crude coal gas. The quenched water and crude coal gas are converted into ash water after being suffered from the mass transfer and heat transfer. The fine ash in the crude coal gas enters into the ash water, and the ash water overflows by means of the overflow to the crude coal gas outlet 404, and is sent to the subsequent workshop section together with the washed crude coal gas. The larger slag is deposited at the bottom of the quenching chamber 40 and is discharged through the slag outlet 415.

In the above embodiment, the quenching chamber is not provided with an ash water outlet, and the liquid level of the quenching chamber is not controlled. The washed ash water is discharged from the gasification furnace by means of the overflowing together with the quenched crude coal gas. The height of the liquid level of the quenching chamber remains essentially a constant liquid level. This structure arrangement is cut off the overheating risk of the housing of the quenching section from the source, so that the gasification furnace equipment with a waste boiler itself is intrinsically safe in the true sense, eliminating mistakes and errors which may be caused by the manual operation and instrument monitoring.

While the present disclosure has been described in detail by way of general description and specific embodiments thereof, it will be apparent to those skilled in the art that modifications and improvements may be made thereto based on the present disclosure. Accordingly, such modifications or improvements made without departing from the spirit of the disclosure are falling within the scope of the protection of the present disclosure.

What is claimed is:

1. A constant liquid level gasification furnace with a waste boiler comprising:
   a housing and an inner assembly; an upper portion of an inner space of the housing is defined as a gasification section, a middle portion of the inner space of the housing is defined as a radiant section, and a lower portion of the inner space of the housing is defined as a quenching section; wherein,
   the gasification section internally includes a burner, a membrane type water-cooled wall and a heat-resistant passage, the inner region defined by the membrane type water-cooled wall is a gasification chamber;
   the radiant section internally includes a built-in radiant waste boiler assembly, the internal region defined by the built-in radiant waste boiler assembly is a radiant chamber; and
   the quenching section internally includes a quenched water inlet, a quenched water film generator, a water film passage, a crude coal gas outlet and a slag outlet, the region defined by the quenching section is a quenching chamber, wherein at an axial height of the housing, a bottom end of the water film passage is lower than a lower edge of the crude coal gas outlet so that washed ash water converted from quenched water and crude coal gas overflows to the crude coal gas outlet, and is sent to subsequent workshop section together with washed crude coal gas.

2. The constant liquid level gasification furnace with a waste boiler of claim 1, wherein the burner is at the top of the housing, and the burner passes through the housing and the membrane type water-cooled wall into the interior of the gasification chamber; the bottom of the gasification chamber has the heat-resistant passage.

3. The constant liquid level gasification furnace with a waste boiler of claim 2, wherein the heat-resistant passage extends into the interior of the radiant chamber, and the bottom of the radiant chamber connects to the water film passage.

4. The constant liquid level gasification furnace with a waste boiler of claim 3, wherein the water film passage extends below the liquid level of the quenching chamber; the quenched water inlet is connected with the quenched water film generator, which is connected with the tip of the water film passage; the crude coal gas outlet is provided on the housing of the quenching section.

5. The constant liquid level gasification furnace with a waste boiler of claim 1, wherein at the axial height of the housing, the bottom end of the water film passage is 50-200 cm lower than the lower edge of the crude coal gas outlet.

6. The constant liquid level gasification furnace with a waste boiler of claim 5, wherein at the axial height of the housing, the bottom end of the water film passage is 50-100 cm lower than the lower edge of the crude coal gas outlet.

7. The constant liquid level gasification furnace with a waste boiler of claim 6, wherein at the axial height of the housing, the bottom end of the water film passage is 80-100 cm lower than the lower edge of the crude coal gas outlet.

8. The constant liquid level gasification furnace with a waste boiler of claim 1, wherein the built-in radiant waste boiler assembly employs a double-sided water-cooled wall arrangement or a partial double-sided water-cooled wall arrangement.

\* \* \* \* \*